(12) United States Patent
Moon et al.

(10) Patent No.: US 7,844,772 B2
(45) Date of Patent: Nov. 30, 2010

(54) DEVICE DRIVER INCLUDING A FLASH MEMORY FILE SYSTEM AND METHOD THEREOF AND A FLASH MEMORY DEVICE AND METHOD THEREOF

(75) Inventors: Min-Soo Moon, Seoul (KR); Chan-Ik Park, Seoul (KR); Prakash Talawar, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1036 days.

(21) Appl. No.: 11/605,265

(22) Filed: Nov. 29, 2006

(65) Prior Publication Data

US 2008/0082729 A1    Apr. 3, 2008

(30) Foreign Application Priority Data

Oct. 2, 2006    (KR) ...................... 10-2006-0097023

(51) Int. Cl.
*G06F 12/00*    (2006.01)
(52) U.S. Cl. ........................ 711/103; 711/122; 711/170; 711/E12.024
(58) Field of Classification Search ........................ None
See application file for complete search history.

(56) References Cited

U.S. PATENT DOCUMENTS

| | | | |
|---|---|---|---|
| 5,860,083 A * | 1/1999 | Sukegawa | 711/103 |
| 7,106,636 B2 * | 9/2006 | Eilert et al. | 365/189.12 |
| 2004/0205301 A1 * | 10/2004 | Hara et al. | 711/137 |
| 2005/0081009 A1 * | 4/2005 | Williams et al. | 711/163 |
| 2005/0132126 A1 * | 6/2005 | Lin et al. | 711/103 |
| 2007/0079054 A1 * | 4/2007 | Rudelic | 711/103 |
| 2007/0239927 A1 * | 10/2007 | Rogers et al. | 711/103 |

FOREIGN PATENT DOCUMENTS

| | | |
|---|---|---|
| JP | 2004-062554 | 2/2004 |
| JP | 2005-092677 | 4/2005 |
| KR | 10-2006-0080972 | 7/2006 |

OTHER PUBLICATIONS

Web definition of "device driver" from Google: pp. 2.*

* cited by examiner

*Primary Examiner*—Mardochee Chery
*Assistant Examiner*—Kaushikkumar Patel
(74) *Attorney, Agent, or Firm*—Harness, Dickey & Pierce, P.L.C.

(57) ABSTRACT

A device driver including a flash memory file system and method thereof and a flash memory device and method thereof are provided. The example device driver may include a flash memory file system configured to receive data scheduled to be written into the flash memory device, the flash memory file system selecting one of a first data storage area and a second data storage area within the flash memory device to write the received data to based upon an expected frequency of updating for the received data, the first data storage area configured to store data which is expected to be updated more often than the second data storage area. The example flash memory device may include a first data storage area configured to store first data, the first data having a first expected frequency for updating and a second data storage area configured to store second data, the second data having a second expected frequency of updating, the first expected frequency being higher than the second expected frequency.

30 Claims, 11 Drawing Sheets

DEVICE DRIVER INCLUDING A FLASH MEMORY FILE SYSTEM AND METHOD THEREOF AND A FLASH MEMORY DEVICE AND METHOD THEREOF

PRIORITY STATEMENT

This application claims priority under 35 USC §119 to Korean Patent Application No. 2006-97023, filed on Oct. 2, 2006 in the Korean Intellectual Property Office (KIPO), the disclosure of which is incorporated herein in its entirety by reference.

BACKGROUND OF THE INVENTION

1. Field of the Invention

Example embodiments of the present invention relate generally to a device driver including a flash memory file system and method thereof and a flash memory device and method thereof, and more particularly to a device driver including a flash memory file system and a method of managing the flash memory file system and a flash memory device and method of storing information within the flash memory device.

2. Description of the Related Art

Flash memory devices may be configured to have attributes associated with both a random access memory (RAM) and a read-only memory (ROM). For example, a conventional flash memory device may be configured to re-write over old data, as in a RAM, and also to maintain stored data without a continuous power supply, as in a ROM or "solid-state" memory device.

Conventional flash memory device may be different from other types of storage devices, such as hard disk devices and semiconductor memory devices, such as RAM and ROM. For example, a conventional flash memory device may not perform an in-place update on areas in which data may already be written. Accordingly, software may be provided so as to instruct conventional flash memory devices to perform in-place updates.

Hereinafter, operation of a conventional flash memory device driver will be described with reference to FIGS. 1 through 4.

Figure 1:
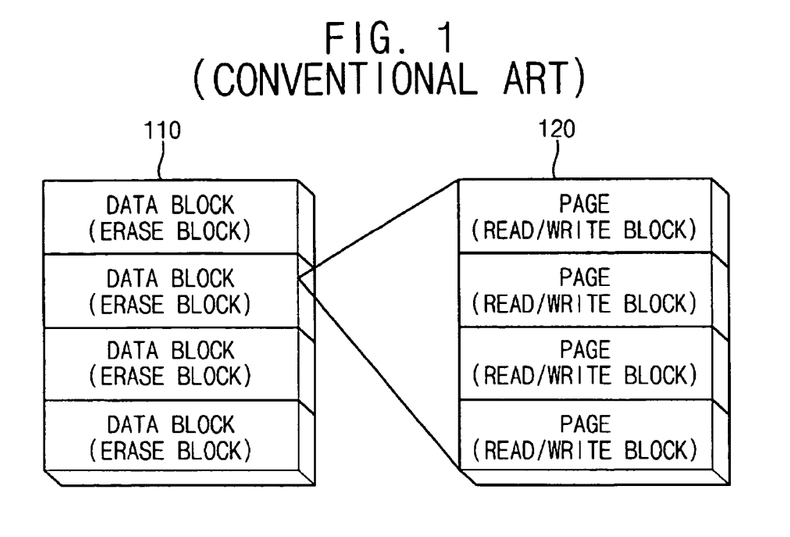
FIG. 1 is a diagram illustrating a structure of data blocks stored in a conventional flash memory device.

FIG. 1 is a diagram illustrating a structure of data blocks stored in a conventional flash memory device. Referring to FIG. 1, the flash memory device may include a plurality of data blocks 110, each including a plurality of pages 120. For example, each data block 110 may include four pages and a page size may correspond to a size of a sector (e.g., 512 bytes).

Referring to FIG. 1, the flash memory device driver may perform an erase operation on the data blocks 110 and may perform read and write operations on the pages 120 within respective data blocks 110. A logical address generated by an application may typically not be directly written to the flash memory device. Rather, a virtual or physical address for a particular data block 110 may be obtained based on the logical address through a "mapping" process.

Figure 2:
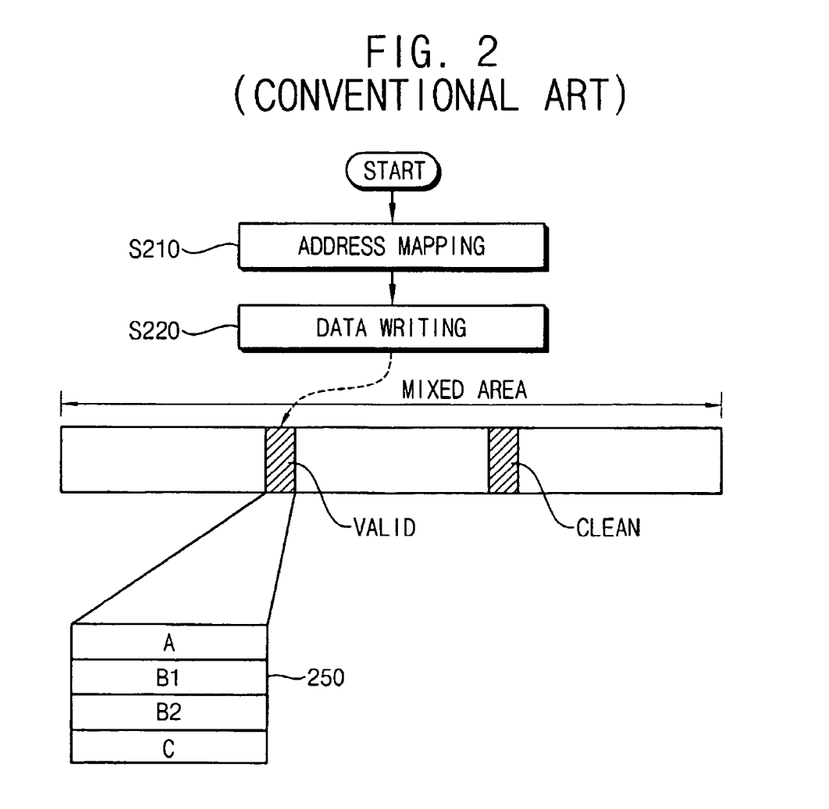
FIGS. 2 through 4 are diagrams for illustrating a write operation performed by the flash memory device driver of FIG. 1.
Figure 3:
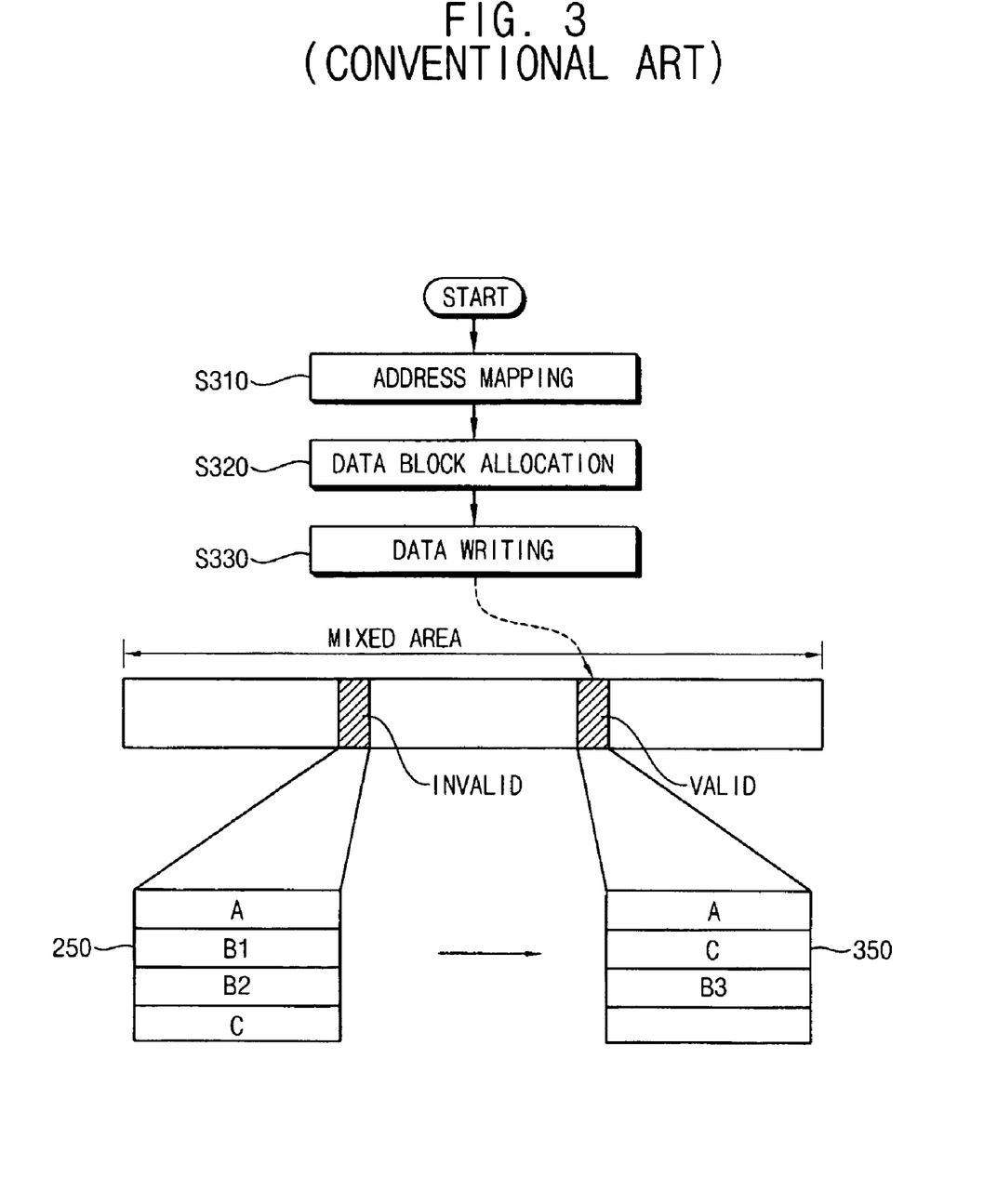
Figure 4:
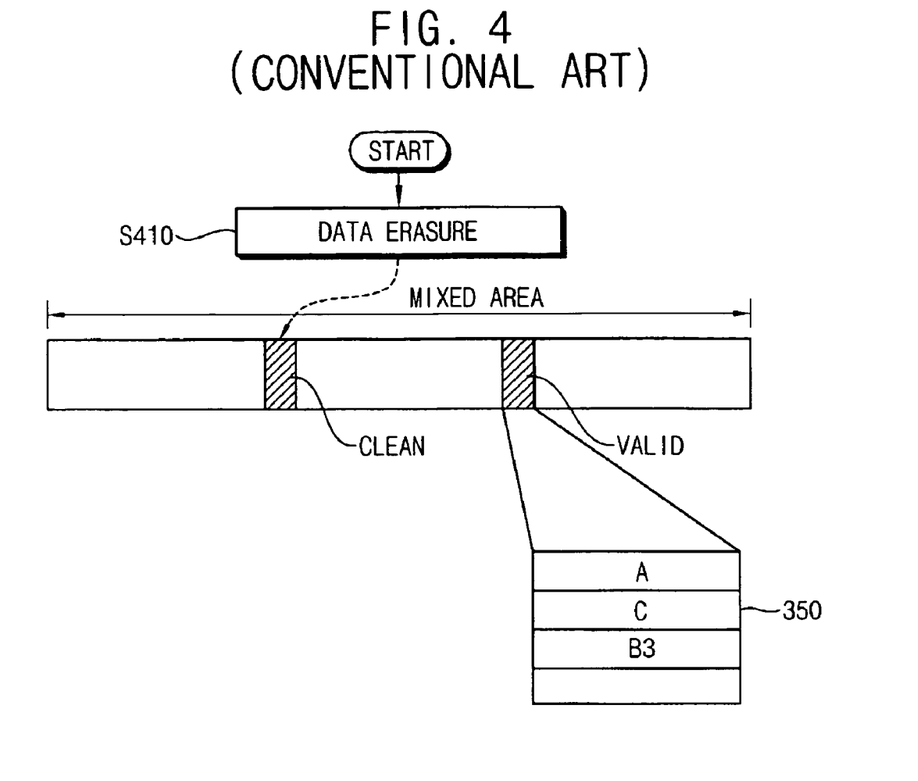

FIGS. 2 through 4 are diagrams for illustrating a write operation performed by the flash memory device driver of FIG. 1. Referring to FIG. 2, the flash memory device driver may receive a logical address from an application (e.g., a software application) and may map the received logical address into a virtual address (e.g., a physical address) used in the flash memory device (at S210). The flash memory device driver may write data based on the mapped virtual address (at S220).

Referring to FIG. 3, assuming that first data A and second data B1 are written, and third data B2 modifying the second data B1 and fourth data C are written, the first through fourth data A, B1, B2 and C may be sequentially stored in a data block 250 (e.g., within sequential pages of data block 250). The flash memory device driver may receive a logical address of fifth data B3 re-modifying the third data B2. The flash memory device driver may map the virtual address (e.g., in which the data block 250 including the third data B2 may be located) based on the received logical address (at S310).

Referring to FIG. 3, the flash memory device controller may detect that there are no empty pages in the data block 250, and may allocate a new data block 350 (at S320). The flash memory device controller may copy valid data, which may refer to data having a valid value (e.g., the first data A and the fourth data C), into the new allocated data block 350. The flash memory device driver may write the fifth data B3 into an empty page of the new allocated data block 350 (at S330).

Referring to FIG. 4, the flash memory device driver may perform an erase operation on the data block 250 including only invalid data (at S410).

As illustrated in FIGS. 2 through 4, the flash memory device driver may allocate a significant amount of time to page-copying if pages in the data block are changed or frequently updated. Accordingly, frequently updating pages may degrade a performance of the flash memory device. For example, even if the first and fourth data A and C are not modified, the first and fourth data A and C may be copied due to their relationship to more frequently modified data, such as the second data B1.

SUMMARY OF THE INVENTION

An example embodiment of the present invention is directed to a device driver managing access to a flash memory device, including a flash memory file system configured to receive data scheduled to be written into the flash memory device, the flash memory file system selecting one of a first data storage area and a second data storage area within the flash memory device to write the received data to based upon an expected frequency of updating for the received data, the first data storage area configured to store data which is expected to be updated more often than the second data storage area.

Another example embodiment of the present invention is directed to a flash memory device, including a first data storage area configured to store first data, the first data having a first expected frequency for updating and a second data storage area configured to store second data, the second data having a second expected frequency of updating, the first expected frequency being higher than the second expected frequency.

Another example embodiment of the present invention is directed to a method of managing a flash memory file system, including receiving data scheduled to be written into the flash memory device and selecting one of a first data storage area and a second data storage area within the flash memory device to write the received data to based upon an expected frequency of updating for the received data, the first data storage area configured to store data which is expected to be updated more often than the second data storage area.

Another example embodiment of the present invention is directed to a method of storing information within a flash memory device, including storing first data within a first data storage area of the flash memory device, the first data having a first expected frequency for updating and storing second data within a second data storage area of the flash memory device, the second data having a second expected frequency of updating, the first expected frequency being higher than the second expected frequency.

Another example embodiment of the present invention is directed to a device driver capable of reducing the number of read and write operations on a flash memory device.

Another example embodiment of the present invention is directed to a computing system having the device driver capable of reducing the number of read and write operations on a flash memory device.

Another example embodiment of the present invention is directed to a flash memory device separated between a hot data storage area and a cold data storage area for reducing the number of read and write operations on a flash memory device.

Another example embodiment of the present invention is directed to a method of managing a flash memory file system for reducing the number of read and write operations on a flash memory device.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention.

DETAILED DESCRIPTION OF EXAMPLE EMBODIMENTS OF THE PRESENT INVENTION

Detailed illustrative example embodiments of the present invention are disclosed herein. However, specific structural and functional details disclosed herein are merely representative for purposes of describing example embodiments of the present invention. Example embodiments of the present invention may, however, be embodied in many alternate forms and should not be construed as limited to the embodiments set forth herein.

Accordingly, while example embodiments of the invention are susceptible to various modifications and alternative forms, specific embodiments thereof are shown by way of example in the drawings and will herein be described in detail. It should be understood, however, that there is no intent to limit example embodiments of the invention to the particular forms disclosed, but conversely, example embodiments of the invention are to cover all modifications, equivalents, and alternatives falling within the spirit and scope of the invention. Like numbers may refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 5:
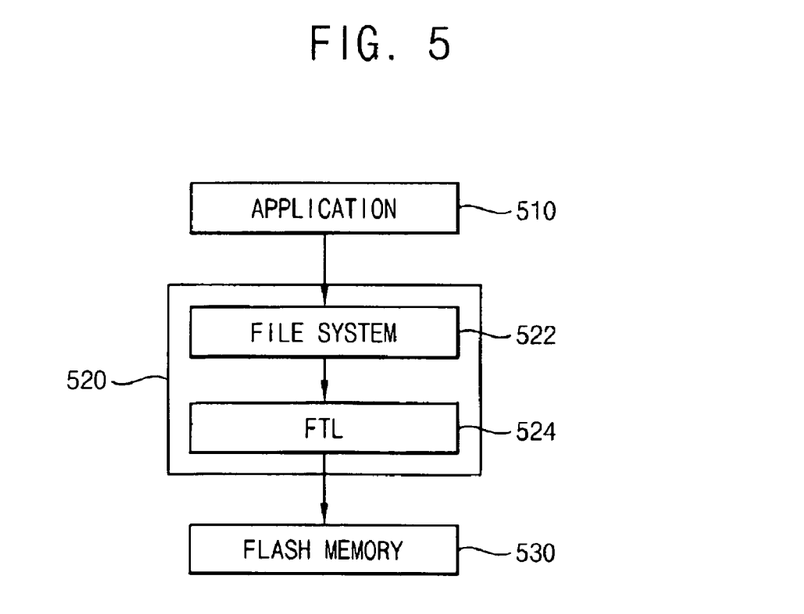
FIG. 5 is a block diagram illustrating a flash memory device system according to an example embodiment of the present invention.

FIG. 5 is a block diagram illustrating a flash memory device system according to an example embodiment of the present invention. The flash memory device system of FIG. 5 may include an application 510, a flash memory device driver 520 and a flash memory device 530.

In the example embodiment of FIG. 5, the flash memory device driver 520 may include a file system 522 and a flash translation layer (FTL) 524. In an example, the flash memory device driver 520 may be included within a computing system (not shown) and may be coupled to the flash memory device 530. In an example, the flash memory device 530 may include a "hot" data storage area for storing "hot" data, or data for which frequent updates are expected. The flash memory device 530 may further include a "cold" data storage area for storing "cold" data, or data for which frequent updates are not expected.

In the example embodiment of FIG. 5, the flash memory device driver 520 may manage a flash memory file system (e.g., file system 522) that writes data into one of the hot data storage area and the cold data storage area based on a data type if the application 510 writes the data into the flash memory device. In an example, the application 510 may include an operating system in the computing system and a program executed based on the operating system.

In the example embodiment of FIG. 5, the file system 522 may receive a logical address from the application 510. The logical address may include a filepath of data and a filename of the data. An operation of the file system 522 will be described later with respect to the example embodiments of FIGS. 8 through 13.

In the example embodiment of FIG. 5, the FTL 524 may determine the data type if the application 510 writes the data based on the received logical address. The FTL 524 may then map, based on the determined data type, the logical address into a virtual address (e.g., a physical address) of the hot data storage area or the cold data storage area. The FTL 524 may write the data based on the mapped virtual address. For example, the virtual address may include a physical address used in the flash memory device 530.

In the example embodiment of FIG. 5, if the data generated by the application 510 is determined to correspond to hot data, the FTL 524 may write the data into the hot data storage area of the flash memory device 530. Alternatively, if the data generated by the application 510 is determined to correspond to cold data, the FTL 524 may write the data into the cold data storage area of the flash memory device 530. For example, the hot data may include a file allocation table (FAT) and a directory entry (DE), and the hot data storage area may include a FAT storage area for storing the FAT and a DE storage area for storing the DE. Additionally, the hot data may further include user-defined hot data (UHD), and the hot data storage area may further include a UHD storage area for storing the UHD.

Figure 6:
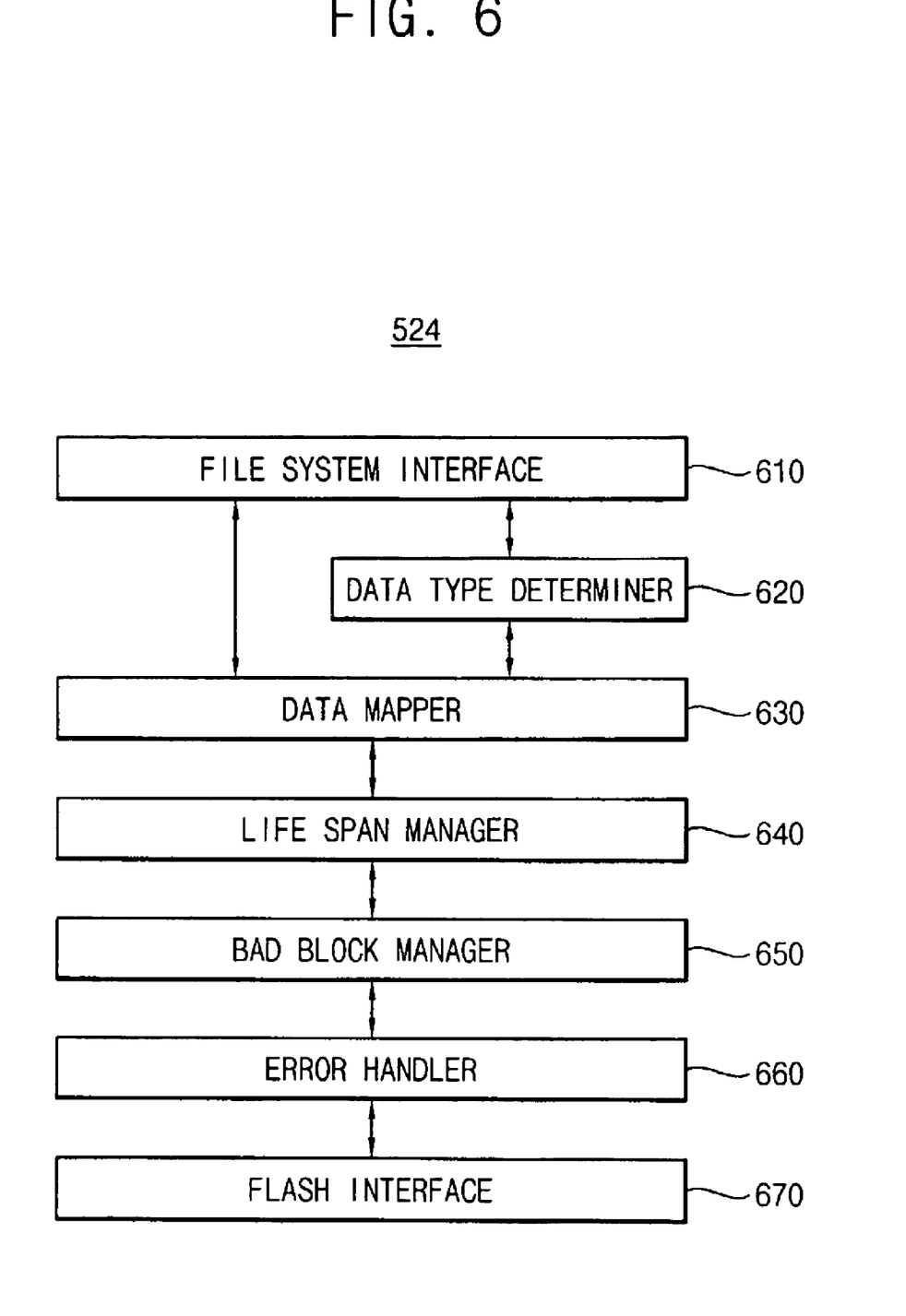
FIG. 6 is a block diagram illustrating a configuration of a flash translation layer (FTL) according to another example embodiment of the present invention.

FIG. 6 is a block diagram illustrating a configuration of the FTL 524 of FIG. 5 according to another example embodiment of the present invention.

In the example embodiment of FIG. 6, the FTL 524 may include a file system interface 610, a data type determiner 620, a data mapper 630, a flash memory life span manager 640, a bad block manager 650, an error handler 660 and a flash interface 670.

In the example embodiment of FIG. 6, the file system interface 610 may provide an interface between the file system 522 and the FTL 524. The data type determiner 620 may determine the data type (e.g., "hot" or "cold") if the application 510 writes the data based on the logical address. For example, the data type determiner 620 may determine the data type based on the logical address generated by the application 510.

In the example embodiment of FIG. 6, the data mapper 620 may map, based on the determined data type, the logical address into a virtual address of the hot data storage area or the cold data storage area. In an example, the data mapper 620 may map the logical address into an empty page in a data block as the virtual address if the data block into which the data is written includes the empty page. In another example, the data mapper 620 may allocate a new data block and may copy a valid page in the data block into the allocated new data block, if the data block into which the data is written has no empty pages and has an invalid page. In another example, the data mapper 620 may map the logical address into the empty page in the allocated new data block as the virtual address. Additionally, the data mapper 620 may perform an erase operation on the data block after copying the valid page.

In the example embodiment of FIG. 6, the data mapper 620 may allocate the new data block if the data block into which the data is written has no empty pages and no invalid pages, and may map the logical address into the empty page in the allocated new data block as the virtual address. That is, the data mapper 620 may provide the empty page as the virtual address such that the application 510 may write the data into the flash memory device 530.

In the example embodiment of FIG. 6, the flash memory life span manager 640 may remap the mapped virtual address into a new virtual address having a reduced number of erase operations (or write operations). Therefore, data blocks in the flash memory device 530 may each have a similar number of erase operations. Thus, a number of erase operations (or write operations) may be finite because physical defects of the flash memory device may be increased as a number of operations (e.g., write or erase operations) is increased.

In the example embodiment of FIG. 6, the bad block manager 650 may translate the mapped virtual address into a new virtual address if the mapped virtual address (e.g., a redundant address) corresponds to a bad block address (e.g., a block address corresponding to a data block including at least one defective page). The new virtual address may not correspond to a bad block. In other example, the bad block manager 650 may be implemented such that normal pages in the bad block may be used, while "bad" pages within the bad block may not be used.

In the example embodiment of FIG. 6, the error handler 660 may add an error correction code into the data when the application 510 writes the data. The error handler 660 may verify the data when the application 510 later reads the written data by comparing the written error correction code with the read error correction code. The flash interface 670 may provide an interface between the FTL 524 and the flash memory device 530.

Figure 7:
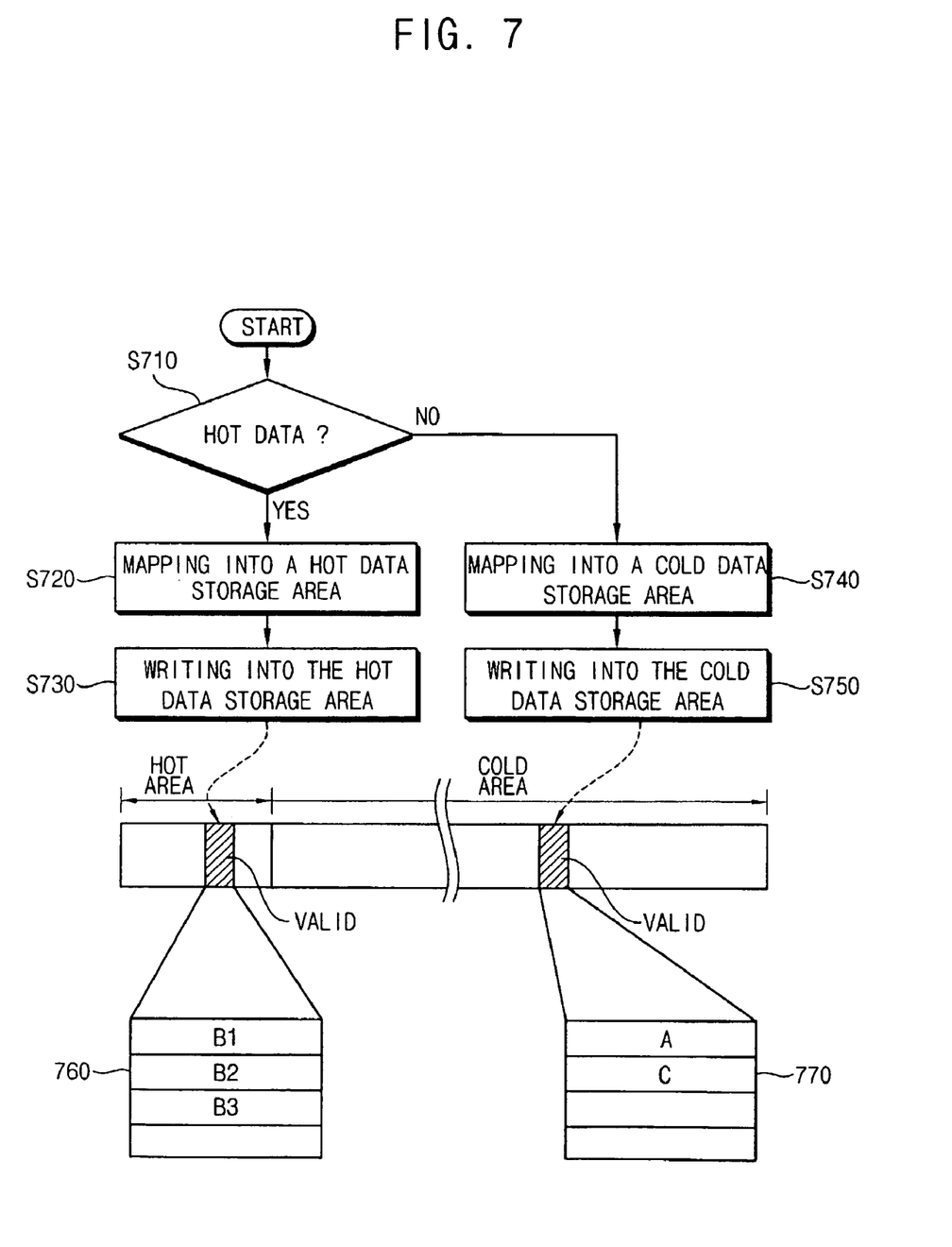
FIG. 7 is a diagram for illustrating a write operation performed by the FTL of FIG. 6 according to another example embodiment of the present invention.

FIG. 7 is a diagram for illustrating a write operation performed by the FTL 524 of FIG. 6 according to another example embodiment of the present invention.

In the example embodiment of FIG. 7, the data type may be determined, for example, by the data type determiner 620 in FIG. 6 if the application 510 transmits data to be written (at S710). If the data type is determined to correspond to hot data, the FTL 524 may map a logical address generated by the application 510 into a virtual address within the hot data storage area of the flash memory device 530 (at S720). If the hot data storage area includes a FAT storage area, a DE storage area and a UHD storage area, the FTL 524 may store the data into one of the FAT storage area, the DE storage area and the UHD storage area based on the determined data type. The FTL 524 may then write the data into the hot data storage area based on the mapped virtual address (at S730).

In the example embodiment of FIG. 7, alternatively, if the data type is determined to correspond to cold data, the FTL 524 may map the logical address generated by the application 510 into a virtual address in the cold data storage area (at S740). The FTL 524 may then write the data into the cold data storage area based on the mapped virtual address (at S750).

In the example embodiment of FIG. 7, although initial data B1 corresponding to the FAT may be updated twice, the FTL 524 may not perform read and write operations and the data blocks 760 and 770 may be generated. Accordingly, the FTL 524 may reduce the number of read and write operations by separating the hot data storage area and the cold data storage area.

Figure 8:
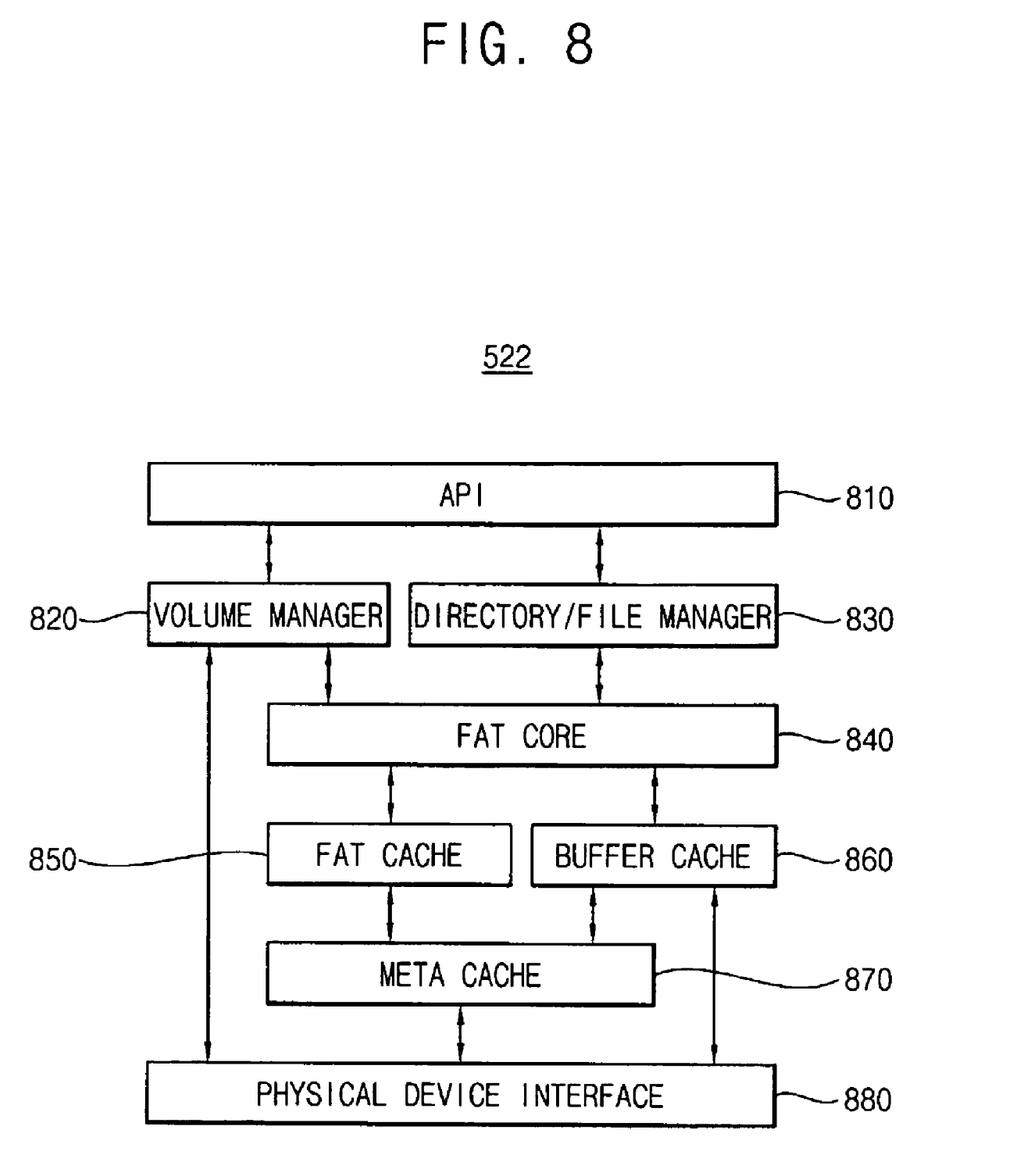
FIG. 8 is a block diagram illustrating a configuration of a file system according to another example embodiment of the present invention.

FIG. 8 is a block diagram illustrating a configuration of the file system 522 of FIG. 5 according to another example embodiment of the present invention.

In the example embodiment of FIG. 8, the file system 522 may include an application programming interface (API) 810, a volume manager 820, a directory and file manager 830, a FAT core 840, a FAT cache 850, a buffer cache 860, a meta cache 870 and a physical device interface 880.

In the example embodiment of FIG. 8, the API 810 may provide an interface between the application 510 and the file system 522. The volume manager 820 may define a data storage area used by the file system 522 as a plurality of logical units, and may perform a format operation on a physical device (e.g., the flash memory device 530).

In the example embodiment of FIG. 8, the directory and file manager 830 may perform operations related with file creation, file allocation and file deletion to the application 510. The FAT core 840 may perform search, allocation and delete operations on the FAT corresponding to a directory and file if the application 510 performs file creation, file allocation and file deletion of the directory and file.

In the example embodiment of FIG. 8, the FAT cache 850 may cache the FAT corresponding to the directory and file if the application 510 performs file creation, file allocation and file deletion of the directory and file. The buffer cache 860 may cache data in the file and directory entry if the application 510 performs file creation, file allocation and file deletion of the directory and file.

In the example embodiment of FIG. 8, the meta cache 870 may re-cache the FAT outputted from the FAT cache 850 and the DE outputted from the buffer cache 860 such that FATs and DEs may be outputted concurrently and/or continuously. The physical device interface 880 may provide an interface between the file system 522 and the FTL 524.

Figure 9:
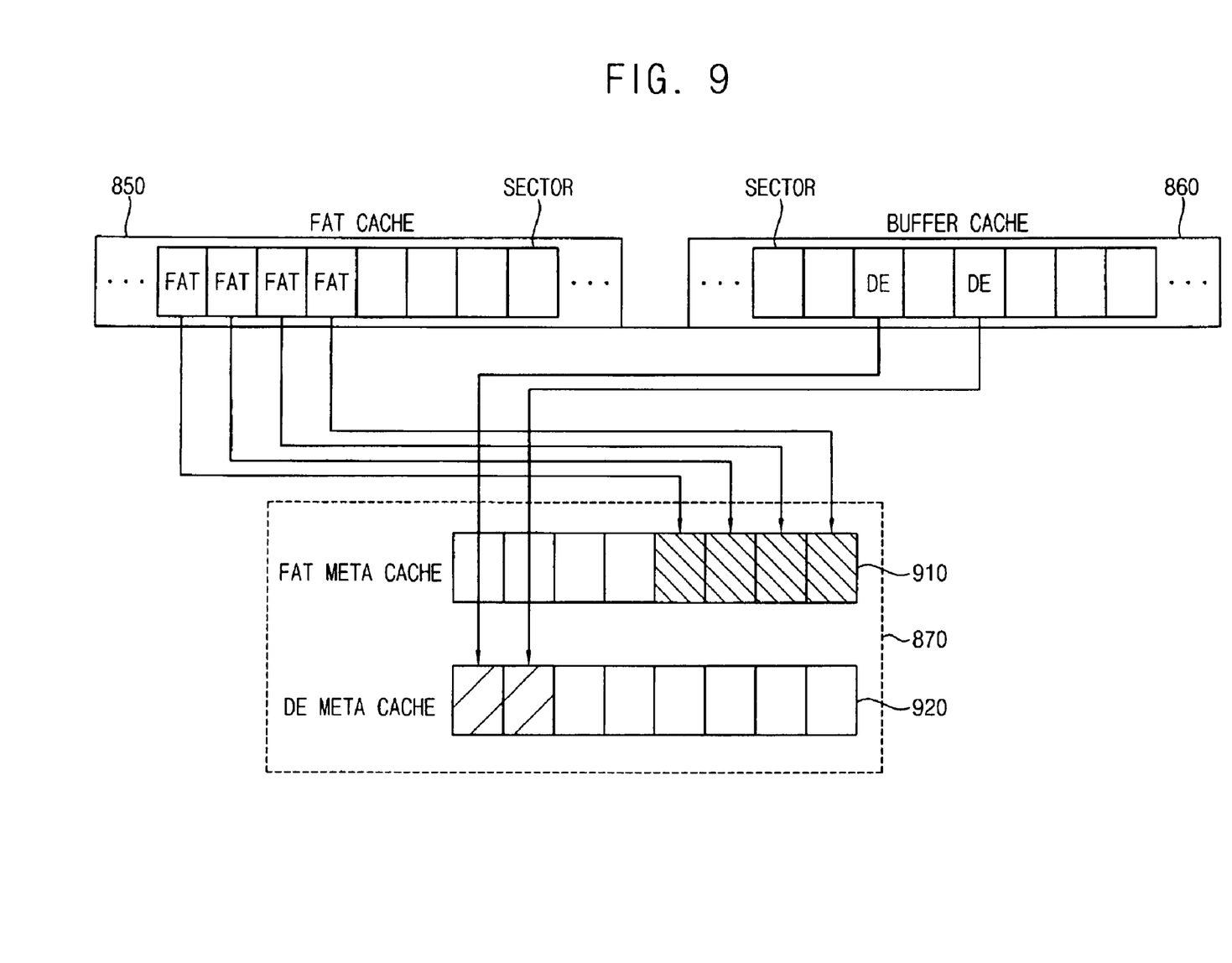
FIG. 9 is a diagram for illustrating an operation of a meta cache according to another example embodiment of the present invention.

FIG. 9 is a diagram for illustrating an operation of the meta cache 870 of FIG. 8 according to another example embodiment of the present invention.

In the example embodiment of FIG. 9, the meta cache 870 may include a FAT meta cache 910 and a DE meta cache 920. The FAT meta cache 910 may re-cache the FAT outputted from the FAT cache such that FATs may be outputted continuously and/or concurrently. For example, the FAT meta cache 910 may re-cache the FAT outputted from the FAT cache 850 to generate continuous FATs so that the FAT meta cache 910 may output the continuous FATs into the flash memory device 530 if a current FAT outputted from the FAT cache 850 and a previous FAT outputted from the FAT cache 850 are continuous. Also, the FAT meta cache 910 may output the continuous FATs in the FAT meta cache 910 and may re-cache the FAT outputted from the FAT cache 850 if a current FAT outputted from the FAT cache 850 and a previous FAT outputted from the FAT cache 850 are not continuous and/or if a number of FATs exceeds a threshold number.

In the example embodiment of FIG. 9, the DE meta cache 920 may re-cache the DE outputted from the buffer cache such that a number of DEs may be outputted continuously and/or concurrently. For example, the DE meta cache 920 may re-cache the DE outputted from the buffer cache 860 to generate continuous DEs so that the DE meta cache 920 may output the continuous DEs into the flash memory device 530 if a current DE outputted from the DE and a previous DE outputted from the buffer cache 860 are continuous. Also, the DE meta cache 920 may output the continuous DEs in the DE meta cache 920 and may re-ache the DE outputted from the buffer cache 860 if a current DE outputted from the buffer cache 860 and a previous DE outputted from the buffer cache 860 are not continuous and/or if a number of DEs exceeds a threshold number.

FIGS. 10 through 13 are flowcharts illustrating operations of the FAT cache 850, the buffer cache 860 and the meta cache 870 according to example embodiments of the present invention.

Figure 10:
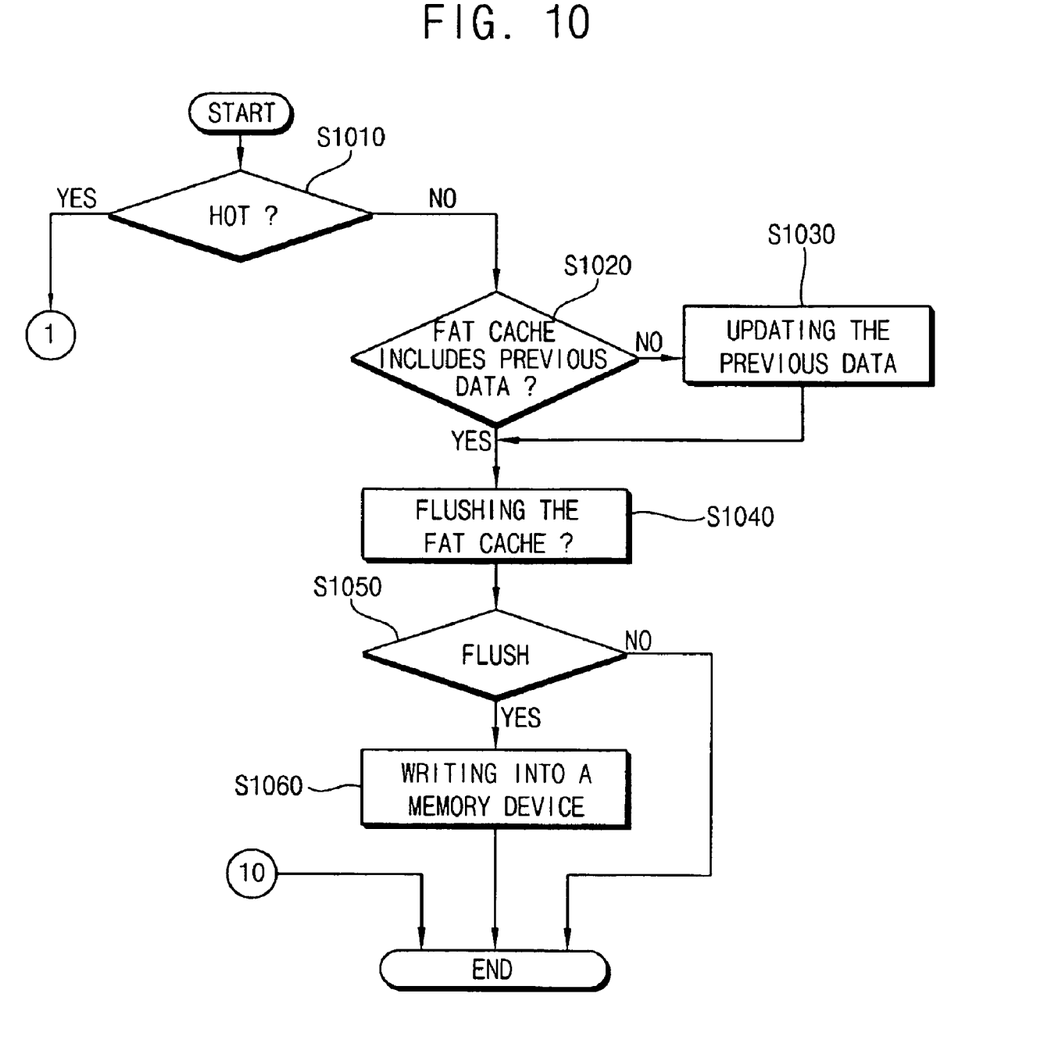
FIGS. 10 through 13 are flowcharts illustrating operations of a FAT cache, a buffer cache and a meta cache according to example embodiments of the present invention.

In the example embodiment of FIG. 10, the FAT cache 850 and/or the buffer cache 860 may receive data from the FAT core 840, and may check whether the received data corresponds to hot data (at S1010). In an example, data within the FAT cache 850 may correspond to hot data, and data related with the DE and UHD in the buffer cache 860 may correspond to hot data.

In the example embodiment of FIG. 10, if the received data does not correspond to hot data, the buffer cache 860 may check whether the buffer cache 860 includes previous data corresponding to the received data (at S1020). If the buffer cache 860 does not include previous data corresponding to the received data, the buffer cache 860 may load, from the flash memory device 530, the data corresponding to the received data into the buffer cache 860 (at S1030). The buffer cache 860 may update the previous data with the received data (at S1040). The buffer cache may determine whether the updated data is to be flushed (at S1050), and may write the updated data into the flash memory device 530 (at S1060). For example, a period of a flush operation may be fixed at a given interval.

Figure 11:
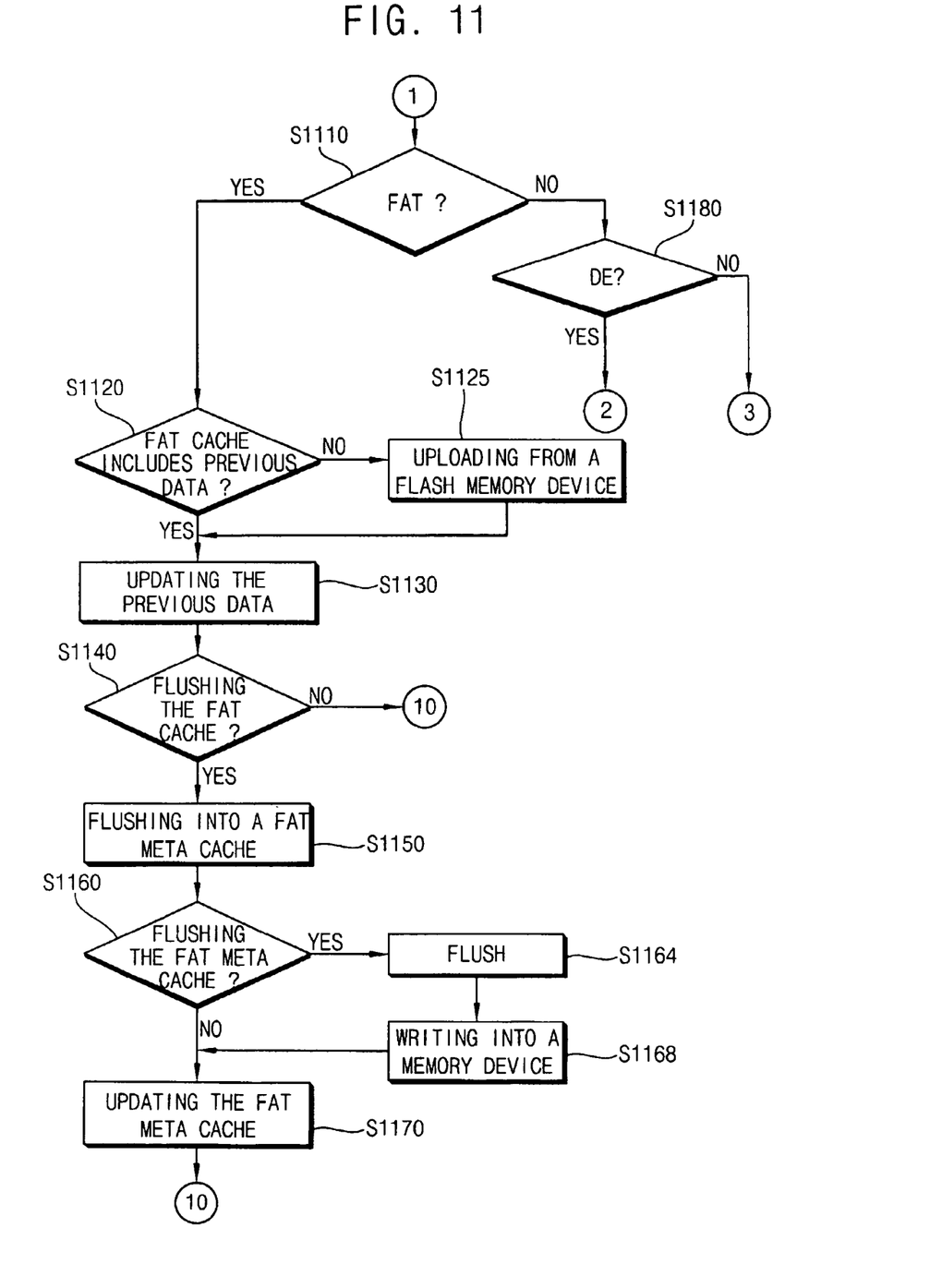

In the example embodiment of FIG. 11, if the received data corresponds to hot data, the FAT cache 850 and/or the buffer cache 860 may determine whether the received data corresponds to FAT (at S1110). If the received data corresponds to hot data, the FAT cache 850 may determine whether the FAT cache 850 includes the previous data corresponding to the received data (at S1120). If the FAT cache 850 does not include the previous data corresponding to the received data, the FAT cache 850 may load, from the flash memory device 530, the data corresponding to the received data into the FAT cache 850 (at S1125). The FAT cache 850 may update the previous data with the received data (at S1130). The FAT cache 850 may determine whether an amount of data stored in the FAT cache 850 exceeds a threshold size of the FAT cache 850 and/or whether the FAT cache 850 is scheduled to update the flash memory device 530 (at S1140). The FAT cache 850 may write the updated data into the FAT meta cache 910 (at S1150).

In the example embodiment of FIG. 11, the FAT meta cache 910 may check whether a current FAT outputted from the FAT cache 850 and a previous FAT outputted from the FAT cache 850 are continuous and/or whether a number of FATs exceeds a threshold number (e.g., a maximum size of the FAT meta cache) and may re-cache the FAT (e.g., the "current" FAT) outputted from the FAT cache 850 (at S1160). The FAT meta cache 910 may output the continuous FATs in the FAT meta cache 910 (Steps S1164 and S1168), and may re-cache the FAT (e.g., the "current" FAT) outputted from the FAT meta cache 910 (at S1170). If the received data does not correspond to the FAT (e.g., the "current" FAT), the buffer cache 860 may determine whether the received data corresponds to the DE (at S1180).

Figure 12:
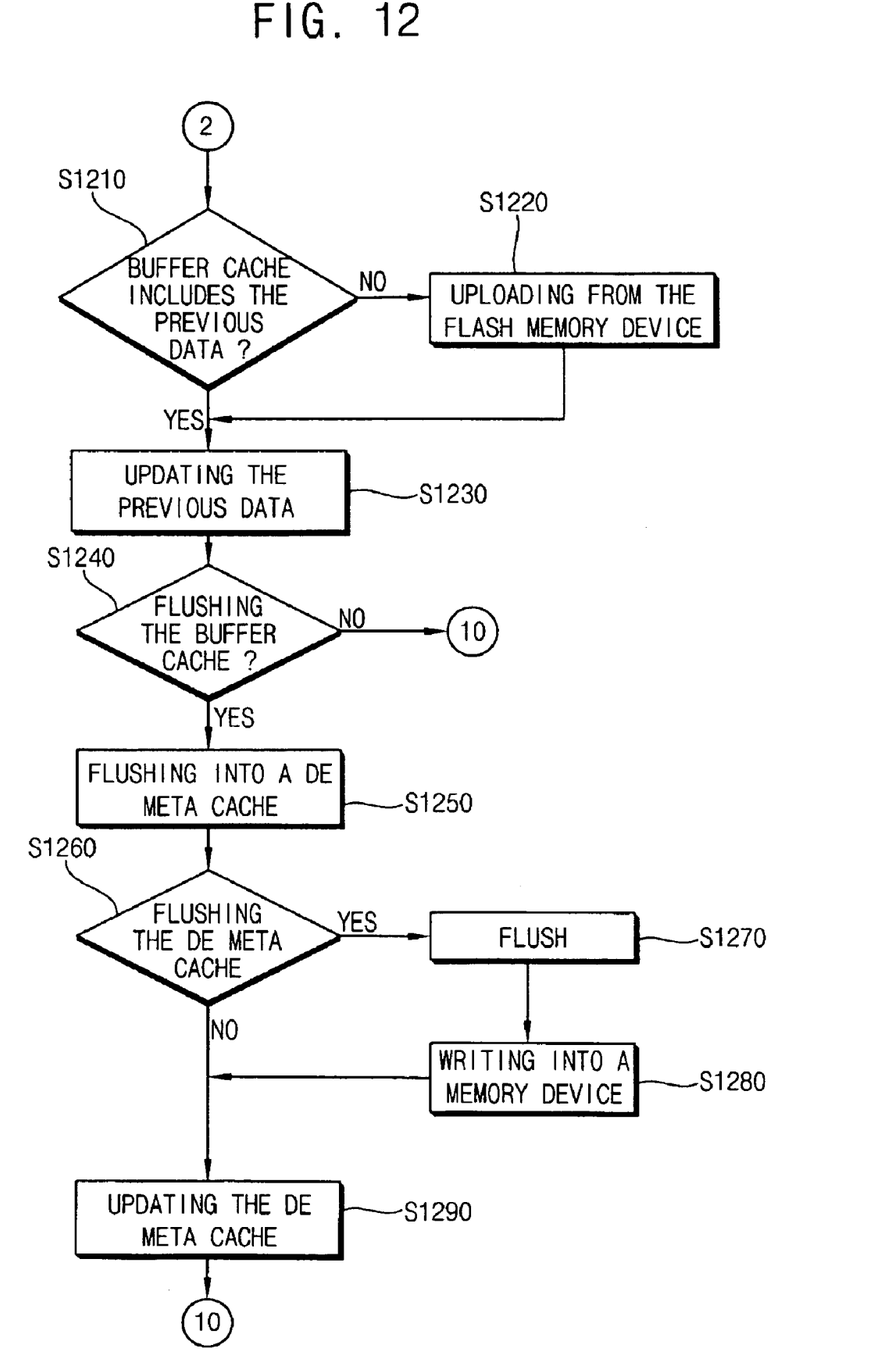

In the example embodiment of FIG. 12, if the received data corresponds to the DE, the buffer cache 860 may determine whether the buffer cache 860 includes previous data corresponding to the received data (at S1210). If the buffer cache 860 does not include previous data corresponding to the received data, the buffer cache 860 may load data corresponding to the received data from the flash memory device 530 (at S1220). The buffer cache 860 may update the previous data with the received data (at S1230). The buffer cache 860 may determine whether an amount of data stored in the buffer cache 860 exceeds a threshold size of the buffer cache 860 and/or whether the buffer cache 860 is scheduled to update the flash memory device 530 (at S1240). The buffer cache 860 may write the updated data into the DE meta cache 920 (at S1250). The DE meta cache 920 may check whether a current DE outputted from the DE cache 860 and a previous DE outputted from the buffer cache 860 are continuous and/or if a number of the DEs exceeds a threshold number (e.g., a maximum size of the DE meta cache) and may re-cache the DE outputted from the buffer cache 860 (at 81260). The DE meta cache 920 may output the continuous DEs in the DE meta cache 920 (at S1270 and S1280), and may re-caches the DE (e.g., the "current" DE) outputted from the DE meta cache 920 (at S1290).

Figure 13:
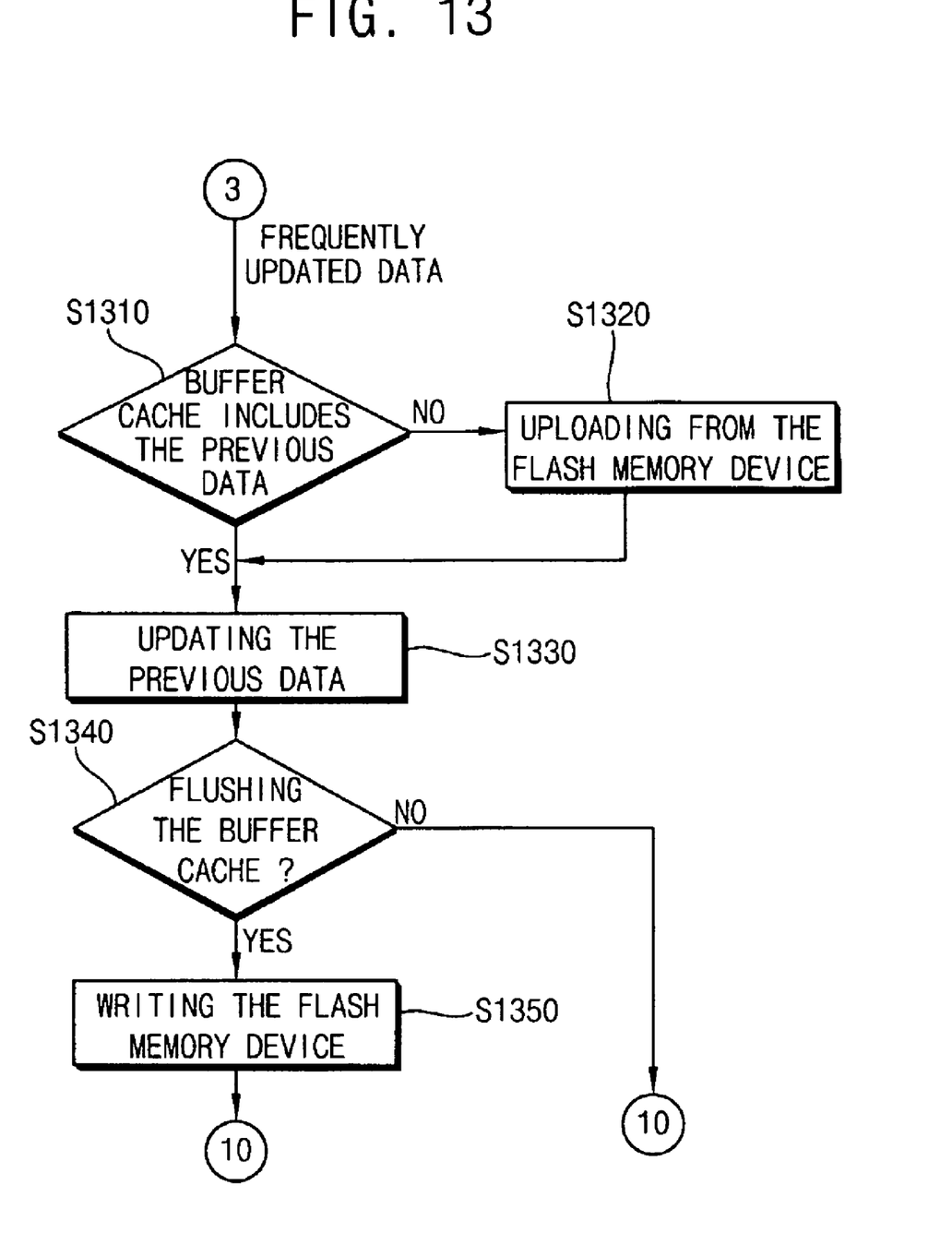

In the example embodiment of FIG. 13, if the received data does not correspond to the DE, the buffer cache 860 may determine whether the buffer cache 860 includes previous data corresponding to the received data (at S1310). If the buffer cache 860 does not include previous data corresponding to the received data, the buffer cache 860 may load data corresponding to the received data from the flash memory device 530 (at S1320). The buffer cache 860 may update the previous data with the received data (at S1330). The buffer cache 860 may determine whether an amount of data stored in the buffer cache 860 exceeds a threshold size of the buffer cache 860 and/or whether the buffer cache 860 is scheduled to update the flash memory device 530 (at S1340). The buffer cache 860 may write the updated data into the flash memory device 530 (at S1350).

In another example embodiment of the present invention, a device driver may be configured so as to reduce a number of read and write operations on a flash memory device (e.g., flash memory device 530 of FIG. 5) by separately managing/storing "hot" data (e.g., data which is updated/changed at a higher rate) and "cold" data (e.g., data which is updated/changed at a lower rate). Further, the example device driver may improve performance of a flash memory file system by reducing a number of copy operations.

Example embodiments of the present invention being thus described, it will be obvious that the same may be varied in many ways. For example, while above-described example embodiments are directed generally to flash memory devices, it will be appreciated that other example embodiments of the present invention may be directed to any well-known type of memory device.

Such variations are not to be regarded as a departure from the spirit and scope of example embodiments of the present invention, and all such modifications as would be obvious to one skilled in the art are intended to be included within the scope of the following claims.

What is claimed is:

1. A non-transitory computer-readable medium storing a device driver, the device driver being executed based on an operating system in a computing system, and managing access to a flash memory device, the device driver comprising:
a flash memory file system configured to receive data scheduled to be written into the flash memory device, the flash memory file system selecting one of a first data storage area and a second data storage area within the flash memory device to write the received data based upon an expected frequency of updating for the received data, the first data storage area configured to store data which is expected to be updated more often than the second data storage area, wherein
the data stored within the first data storage area includes a file allocation table (FAT) and a directory entry (DE), and
the flash memory file system is configured to cache the data stored within the first data storage area including the FAT and the DE, and configured to re-cache the FAT and the DE into a FAT meta cache and a DE meta cache, respectively, such that the FAT and the DE are outputted concurrently.

2. The device driver of claim 1, wherein the flash memory file system includes:
a file system configured to receive a logical address, the logical address including a filepath of the received data and a filename of the received data; and
a flash translation layer (FTL) configured to determine a data type of the received data, and configured to map, based on the determined data type, the logical address into a virtual address corresponding to one of the first storage area and the second storage area, and configured to write the received data based on the mapped virtual address.

3. The device driver of claim 2, wherein, if a given data block into which the received data is written includes an empty page, the FTL maps the logical address into the empty page as the virtual address.

4. The device driver of claim 2, wherein, if a given data block into which the received data is written includes no empty pages and includes at least one invalid page, the FTL allocates a new data block, copies a valid page into the new data block, and maps the logical address into an empty page within the new data block as the virtual address.

5. The device driver of claim 4, wherein the FTL performs an erase operation on the given data block after copying the valid page.

6. The device driver of claim 2, wherein if a given data block into which the received data is written includes no empty pages and no valid pages, the FTL allocates a new data block and maps the logical address into an empty page within the new data block as the virtual address.

7. The device driver of claim 2, wherein the FTL includes:
a data type determiner configured to determine the data type if an application indicates to write the received data based on the logical address; and
a data mapper configured to map, based on the determined data type, the logical address into the mapped virtual address corresponding to one of the first and second data storage areas.

8. The device driver of claim 7, wherein the FTL further includes:
a flash memory life span manager configured to remap the mapped virtual address into a new virtual address having a reduced number of erase operations such that each data block in the flash memory device undergoes a similar number of erase operations.

9. The device driver of claim 7, wherein the FTL further includes:
a bad block manager configured to, if the mapped virtual address corresponds to a bad block, translate the mapped virtual address into a new virtual address corresponding to no bad blocks.

10. The device driver of claim 7, wherein the FTL further includes:
an error handler configured to add an error correction code into the received data if the application indicates that the received data is to be verified when read from the flash memory device.

11. The device driver of claim 1, wherein the first data storage area includes a FAT storage area for storing the FAT and a DE storage area for storing the DE.

12. The device driver of claim 11, wherein the data stored within the first data storage area further includes user-defined hot data (UHD), and the hot data storage area further includes a UHD storage area for storing the UHD.

13. The device driver of claim 11, wherein the file system includes:
   a buffer cache configured to cache the data stored within the first data storage area and the DE corresponding to the stored data; and
   a FAT cache configured to cache the FAT corresponding to the stored data.

14. A computing system, comprising:
   a flash memory device including a first data storage area and a second data storage area; and
   the device driver of claim 1.

15. A non-transitory computer-readable medium storing a device driver, the device driver being executed based on an operating system in a computing system, and managing access to a flash memory device, the device driver comprising:
   a flash memory file system configured to receive data scheduled to be written into the flash memory device, the flash memory file system selecting one of a first data storage area and a second data storage area within the flash memory device to write the received data based upon an expected frequency of updating for the received data, the first data storage area configured to store data which is expected to be updated more often than the second data storage area, wherein
   the data stored within the first data storage area includes a file allocation table (FAT) and a directory entry (DE), and the first data storage area includes a FAT storage area for storing the FAT and a DE storage area for storing the DE, and the file system includes,
   a buffer cache configured to cache the data stored within the first data storage area and the DE corresponding to the stored data,
   a FAT cache configured to cache the FAT corresponding to the stored data,
   a FAT meta cache configured to re-cache the FAT outputted from the FAT cache such that FATs are outputted concurrently, and
   a DE meta cache configured to re-cache the DE outputted from the buffer cache such that DEs are outputted concurrently.

16. The device driver of claim 15, wherein, if a current FAT outputted from the FAT cache and a previous FAT stored in the FAT meta cache are concurrently outputted, the FAT meta cache re-caches the current FAT and the previous FAT to generate FATs that are outputted concurrently to the flash memory device at a given time, and if the current FAT and the previous FAT are not outputted concurrently or if a number of the current FAT and the previous FAT exceeds a threshold, the FAT meta cache outputs the previous FAT and then re-caches the current FAT.

17. The device driver of claim 15, wherein, if a current DE outputted from the buffer cache and a previous DE stored in the DE meta cache are concurrently outputted, the DE meta cache re-caches the DE and the previous DE to generate DEs that are outputted concurrently to the flash memory device, and if the current DE and the previous DE are not outputted concurrently or if a number of the current FAT and the previous FAT exceeds a threshold, the DE meta cache outputs the previous DE and then re-caches the current DE.

18. A method of managing a flash memory file system, the method comprising:
   receiving data scheduled to be written into a flash memory device; and
   selecting one of a first data storage area and a second data storage area within the flash memory device to write the received data based upon an expected frequency of updating for the received data, the first data storage area configured to store data which is expected to be updated more often than the second data storage area, the data selected to be stored within the first data storage area including a file allocation table (FAT) and a directory entry (DE);
   writing the received data into the selected data storage area;
   caching the received data and the DE corresponding to the received data;
   caching the FAT corresponding to the received data;
   re-caching the FAT outputted from a FAT cache into a FAT meta cache so that FATs are outputted concurrently; and
   re-caching the DE into a DE meta cache outputted from the buffer cache so that the DEs are outputted concurrently.

19. The method of claim 18, wherein the selecting and writing steps include:
   receiving a logical address, the logical address including a filepath of the received data and a filename of the received data;
   determining a data type of the received data based on the received logical address;
   mapping, based on the determined data type, the logical address into a virtual address corresponding to one of the first data storage area and the second data storage area; and
   writing the data based on the mapped virtual address.

20. The method of claim 19, wherein mapping the logical address into the virtual address includes
   mapping the logical address into an empty page as the virtual address if a data block into which the data are written includes an empty page.

21. The method of claim 20, wherein mapping the logical address into the virtual address further includes:
   if a given data block into which the received data is written includes no empty pages and includes an invalid page, allocating a new data block, copying a valid page in the data block into the new data block and mapping the logical address into the empty page in the new data block as the virtual address.

22. The method of claim 21, wherein mapping the logical address into the virtual address further includes:
   performing an erase operation on the given data block after copying the valid page.

23. The method of claim 20, wherein mapping the logical address into the virtual address further comprises:
   if a given data block into which the received data is written includes no empty pages and no valid pages, allocating a new data block and mapping the logical address into an empty page in the new data block as the virtual address.

24. The method of claim 20, further comprising:
   remapping the mapped virtual address into a new virtual address having a reduced number of erase operations such that each data block within the flash memory device undergoes a similar number of erase operations.

25. The method of claim 20, further comprising:
   translating the mapped virtual address into a new virtual address if the mapped virtual address corresponds to a bad block.

26. The method of claim 20, further comprising:
   adding an error correction code into the received data if the received data is to be verified when read.

27. The method of claim 20, wherein the first data storage area includes a FAT storage area for storing the FAT and a DE storage area for storing the DE.

28. The method of claim 27, wherein the data selected to be stored within the first data storage area further includes a user defined hot data (UHD), and a UHD storage area for storing the UHD.

29. The method of claim 18, wherein re-caching the FAT outputted from the FAT cache includes:
   re-caching a current FAT and a previous FAT to generate FATs that are outputted concurrently to the flash memory device if the current FAT outputted from the FAT cache and a previous FAT stored in a FAT meta cache are continuous, and
   outputting the previous FAT and re-caching the current FAT if the current FAT and the previous FAT are not continuous or if a number of the current FAT and the previous FAT exceeds a threshold.

30. The method of claim 18, wherein re-caching the DE outputted from the buffer cache includes:
   re-caching a current DE and a previous DE to generate DEs that are outputted concurrently to the flash memory device if the current DE outputted from the buffer cache and the previous DE stored in a DE meta cache are continuous, and outputting the previous DE and re-caching the current DE if the current DE and the previous DE are not continuous or if a number of a current FAT and a previous FAT exceeds a threshold.

* * * * *